(No Model.)
F. J. WEBER.
FEEDER FOR GRAIN TRANSFER SYSTEMS.
No. 585,804. Patented July 6, 1897.
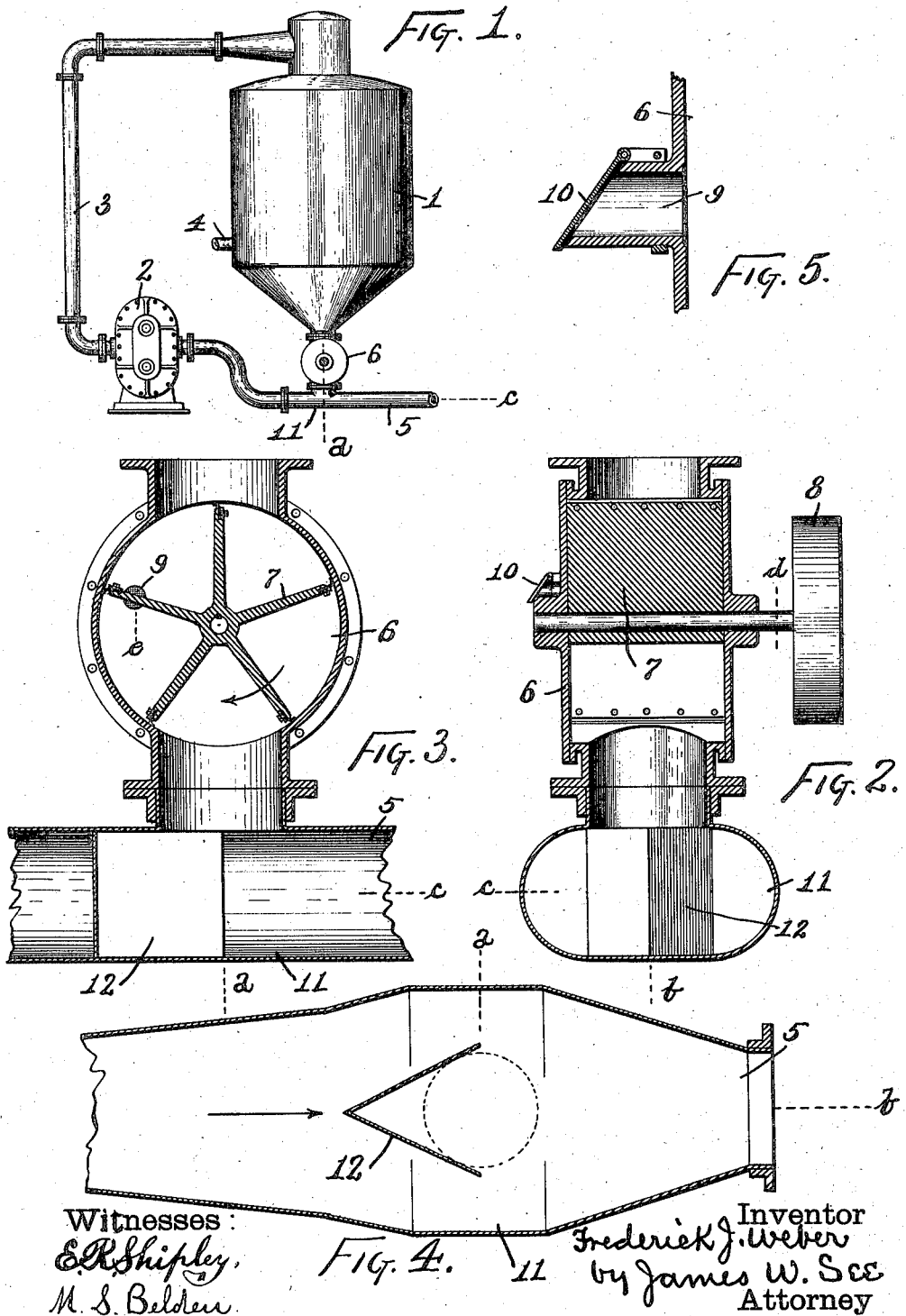

UNITED STATES PATENT OFFICE.

FREDERICK J. WEBER, OF CONNERSVILLE, INDIANA, ASSIGNOR TO THE STEEL STORAGE AND ELEVATOR CONSTRUCTION COMPANY, OF SAME PLACE.

FEEDER FOR GRAIN-TRANSFER SYSTEMS.

SPECIFICATION forming part of Letters Patent No. 585,804, dated July 6, 1897.

Application filed May 5, 1897. Serial No. 635,259. (No model.)

*To all whom it may concern:*

Be it known that I, FREDERICK J. WEBER, of Connersville, Fayette county, Indiana, have invented certain new and useful Improvements in Feeders for Grain-Transfer Systems, of which the following is a specification.

This invention pertains to pneumatic systems for transferring grain and other granular material, and relates to an improved feeder for securing delivery from the vacuum-chamber to the discharge-pipe.

My invention will be readily understood from the following description, taken in connection with the accompanying drawings, in which—

Figure 1 is an elevation of a pneumatic grain-transfer apparatus provided with a feeder exemplifying my invention, the shaft of the feeder appearing in vertical section in the plane of line *d* of Fig. 2; Fig. 2, a vertical section of the feeder and discharge-pipe in the plane of line *a* of Figs. 1, 3, and 4; Fig. 3, a vertical section of the feeder and discharge-pipe in the plane of line *b* of Figs. 2 and 4; Fig. 4 a horizontal section of the discharge-pipe in the plane of line *c* of Figs. 1, 2, and 3; and Fig. 5, a vertical section of the vent-valve of the feeder in the plane of line *e* of Fig. 3.

In the drawings, 1 indicates the vacuum-chamber of a pneumatic apparatus for the transfer of grain or other granular material; 2, the air-pump for operating the apparatus, shown in the present case as an ordinary rotary exhauster and blower; 3, the vacuum-pipe connecting the inlet side of the pump with the top of the vacuum-chamber; 4, grain-inlet pipe to the vacuum-chamber, which pipe is assumed as leading from the point at which the grain is located and from which it is to be transferred, this pipe leading the grain from such point to the vacuum-chamber; 5, the grain-discharge pipe leading from the discharge side of pump 2 and to be assumed as leading to the point to which the grain is to be delivered by the apparatus, this pipe also having communication with the base of the vacuum-chamber, the base of the vacuum-chamber being hopper form; 6, the feeder interposed in the pipe connection between discharge-pipe 5 and the base of the vacuum-chamber, the same consisting of a nicely-bored cylindrical chamber forming an enlargement of the conduit between the vacuum-chamber and the discharge-pipe 5; 7, a paddle-wheel mounted on a shaft for rotation within the feeder-chamber, the extremities of the paddles being packed so as to closely fit the peripheral wall of the chamber, and the sides of the paddle-wheel fitting the end walls of the chamber closely; 8, a pulley on the shaft of the paddle-wheel by means of which the paddle-wheel may be given a continuous rotation; 9, a vent-opening in one of the end walls of the feeder-chamber at a point preferably somewhat above the level of the axis of the feeder-chamber; 10, an outwardly-opening vent-valve at the opening 9; 11, a transverse expansion or widening of pipe 5 at the point of reception by such pipe of the grain from the vacuum-chamber, and 12 an angular divider disposed within the expanded portion 11 of pipe 5 and serving to divide that expanded portion of the pipe into two conduits, one at each side of the point where the grain flows down into the pipe, this divider presenting its apex toward the pump and the discharge from the feeder into the pipe being at the broad end of the divider.

The pump produces a partial vacuum in the vacuum-chamber, resulting in grain being sucked into the vacuum-chamber through pipe 4, the grain gravitating to the base of the vacuum-chamber. At the same time the pump produces a blast of air through pipe 5 in the direction of grain-discharge through that pipe, the current of air produced by this blast dividing at the divider 12, the result being the formation at the base of the angle of the divider of a region of comparatively low pressure, the two air-currents as separated by the divider converging beyond the divider and tending, injector-like, to rarefy the atmosphere at the broad end of the divider and to draw therefrom such air or other material as may be there located. The grain falls from the base of the vacuum-chamber into the pockets formed between the blades of the paddle-wheel, and as that wheel rotates the pockets empty themselves into the discharge-pipe behind the divider, empty pockets coming up to be refilled from the vacuum-chamber. The grain thus dropped into the discharge-pipe is picked up by the blast and carried forward through pipe 5 to the point of delivery. It will be observed that the paddle-wheel acts as a cut-off between the vacuum-chamber and the discharge-pipe, which represent, respectively, points of relatively low and high air-pressures. In many cases the pressure in such of the pockets of the paddle-wheel as are in communication with the discharge-pipe may be considerably in excess of atmospheric pressure, and in such cases the empty pockets as successively brought into communication with the vacuum-chamber would deliver their expansive air to the vacuum-chamber and weaken the vacuum or increase the pumping duty; but vent-valve 10 obviates this by permitting each empty pocket before going into communication with the vacuum-chamber to discharge itself of any contained pressure in excess of atmospheric pressure.

I claim as my invention—

1. The combination, substantially as set forth, of a vacuum-chamber, a discharge-pipe, a pipe connection from the base of the vacuum-chamber to said discharge-pipe, a cylindrical feeder-chamber arranged in and forming a part of such pipe connection, and a paddle-wheel arranged for rotation in said chamber and having close connections with the walls thereof.

2. The combination, substantially as set forth, of a vacuum-chamber, a discharge-pipe, a pipe connection from the base of the vacuum-chamber to said discharge-pipe, a cylindrical feeder-chamber arranged in and forming a part of such pipe connection, a paddle-wheel arranged for rotation in said chamber and having close connections with the walls thereof, and an outwardly-opening valve communicating with the interior of said cylindrical chamber.

3. The combination, substantially as set forth, of a vacuum-chamber, a blast-pipe connected with a source of air-pressure and leading to a point of discharge, a pipe connection placing the base of said vacuum-chamber in communication with said blast-pipe between its source of air-pressure and point of discharge, a cylindrical chamber forming a part of said pipe connection, and a paddle-wheel mounted for rotation in said cylindrical chamber and closely engaging the walls thereof.

4. The combination, substantially as set forth, of a vacuum-chamber, a blast-pipe leading from a source of air-pressure to a point of discharge, a divider disposed in said pipe and serving to divide the air-current passing therethrough, a pipe connection from the base of said vacuum-chamber to said blast-pipe at a point beyond said divider, a cylindrical chamber forming a part of said pipe connection, and a paddle-wheel mounted for rotation within said cylindrical chamber and closely engaging the walls thereof.

FREDERICK J. WEBER.

Witnesses:
W. E. WILL,
L. E. LOWE.